US012802918B2

(12) United States Patent
Tsai et al.

(10) Patent No.: US 12,802,918 B2
(45) Date of Patent: Nov. 17, 2026

(54) PROTECTION DEVICE

(71) Applicant: POLYTRONICS TECHNOLOGY CORP., Hsinchu (TW)

(72) Inventors: Tung-Cheng Tsai, Taoyuan City (TW); Po-Chih Shen, Zhudong Township, Hsinchu County (TW); Wei-Tsang Tai, Hsinchu City (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 273 days.

(21) Appl. No.: 18/600,175

(22) Filed: Mar. 8, 2024

(65) Prior Publication Data

US 2025/0079104 A1 Mar. 6, 2025

(30) Foreign Application Priority Data

Sep. 4, 2023 (TW) ................................ 112133405

(51) Int. Cl.
*H01H 85/00* (2006.01)
*H01H 37/76* (2006.01)
*H01H 85/02* (2006.01)
*H01H 85/055* (2006.01)
(Continued)

(52) U.S. Cl.
CPC ........ *H01H 85/055* (2013.01); *H01H 37/761* (2013.01); *H01H 85/0047* (2013.01); *H01H 85/02* (2013.01); *H01H 85/06* (2013.01); *H01H 85/08* (2013.01); *H01H 2085/0555* (2013.01); *Y02E 60/10* (2013.01)

(58) Field of Classification Search
CPC ............ H01H 85/055; H01H 85/0047; H01H 37/761; H01H 37/76; H01H 85/06; H01H 85/08; H01H 85/02; H01H 2085/0555; Y02E 60/10
USPC .......................................................... 337/142
See application file for complete search history.

(56) References Cited

U.S. PATENT DOCUMENTS 2,911,504 A * 11/1959 Cohn .................. H01G 9/0003 337/296
4,315,235 A * 2/1982 Jacobs, Jr. ............ H01H 85/08 337/296
(Continued)

FOREIGN PATENT DOCUMENTS

CN 111699600 A 9/2020
TW 201944723 A 11/2019
(Continued)

*Primary Examiner* — Anatoly Vortman
(74) *Attorney, Agent, or Firm* — MUNCY, GEISSLER, OLDS & LOWE, P.C.

(57) ABSTRACT

A protection device includes a meltable conductor, an electrode set, and a heating element. The meltable conductor has a core metal layer and a bottom covering layer with low melting point. The core metal layer has a first low melting point metal layer, a second low melting point metal layer, and a high melting point metal layer laminated therebetween. The bottom covering layer with low melting point is disposed on a bottom surface of the core metal layer. The electrode set has a first electrode and a second electrode respectively connected to two terminals of the meltable conductor. The heating element is disposed under the bottom covering layer, thereby heating up and blowing the meltable conductor in the event of over-voltage.

8 Claims, 9 Drawing Sheets

(51) Int. Cl.
*H01H 85/06* (2006.01)
*H01H 85/08* (2006.01)

(56) References Cited

U.S. PATENT DOCUMENTS

| | | | | | |
|---|---|---|---|---|---|
| 4,320,374 | A * | 3/1982 | Narancic | H01H 85/055 337/296 |
| 6,452,475 | B1 * | 9/2002 | Kawazu | H05K 1/0293 337/296 |
| 6,462,318 | B2 * | 10/2002 | Furuuchi | H10W 42/80 219/494 |
| 6,566,995 | B2 * | 5/2003 | Furuuchi | H10W 20/493 337/182 |
| 9,779,904 | B2 * | 10/2017 | Ishikawa | H01H 85/06 |
| 10,008,356 | B2 * | 6/2018 | Yoneda | H01H 37/761 |
| 10,269,523 | B2 * | 4/2019 | Yoneda | H01H 37/761 |
| 10,600,602 | B2 * | 3/2020 | Yoneda | H01H 85/06 |
| 10,707,043 | B2 * | 7/2020 | Yoneda | H01H 85/12 |
| 10,727,019 | B2 * | 7/2020 | Yoneda | H01H 85/0056 |
| 11,640,892 | B2 * | 5/2023 | Nakajima | B23K 35/262 337/142 |
| 2016/0013001 | A1 * | 1/2016 | Yoneda | H01H 85/06 337/290 |
| 2020/0176210 | A1 * | 6/2020 | Yoneda | H01H 85/06 |
| 2020/0395750 | A1 | 12/2020 | Yoneda | |
| 2021/0183605 | A1 * | 6/2021 | Su | H01H 85/046 |

FOREIGN PATENT DOCUMENTS

| | | | |
|---|---|---|---|
| TW | 202110020 | A | 3/2021 |
| TW | 202115979 | A | 4/2021 |

* cited by examiner

PROTECTION DEVICE

BACKGROUND OF THE INVENTION

(1) Field of the Invention

The present application relates to a protection device, and more specifically, to a fast-acting protection device exhibiting a wide range in operating current.

(2) Description of the Related Art

Fuses containing low melting point metals, such as, lead, tin or antimony, are well-known protection devices to cut off currents. To prevent over-current and over-voltage, various protection devices are continuously developed. For example, a device containing a substrate on which a heating layer and a low melting point metal layer are stacked in sequence. The heating layer heats up in the event of over-voltage, and then the heat is transferred upwards to the low melting point metal layer. As a result, the low melting point metal layer is melted and blown to sever currents flowing therethrough, so as to protect circuits or electronic apparatuses.

Recently, mobile apparatuses such as cellular phones and laptop computers are widely used, and people increasingly rely on such products over time. However, burnout or explosion of batteries of cellular phones or portable products during charging or discharging is often seen. Therefore, the manufacturers continuously improve the designs of over-current and over-voltage protection devices to prevent the batteries from being blown due to over-current or over-voltage during charging or discharging.

In a known protection device, a fuse containing a low melting point metal layer is in series connection to a power line of a battery, and the low melting point metal layer and a heating layer are electrically coupled to a switch and an integrated circuit (IC) device. When the IC device detects an over-voltage event, the IC device enables the switch to "on". As a result, current flows through the heating layer to generate heat to melt and blow the low melting point metal layer, so as to sever the power line to the battery for over-voltage protection. Moreover, it can be easily understood that the fuse itself can be heated and blown by a large amount of current in the event of over-current, and therefore over-current protection can also be achieved.

However, miniaturization is the current trend for electronic apparatuses, indicating that the electronic apparatuses equipped with protection devices will also become smaller in size in the future. It is understood that the interior components in the electronic apparatuses become more sensitive to any changes in temperature, current, and voltage as the size of electronic apparatuses decreases. The damage caused by high temperature, current surge, or voltage surge is easily magnified, and the overall performance of electronic apparatuses is more significantly compromised as such damage persists over time. In light of this, the blowing efficiency of protective devices needs to be improved. Additionally, there is a wide variety of electronic apparatuses, each with its corresponding operating current, therefore widening the protection range in current under the same structural design is also one of the most important issues.

Accordingly, there is a need to improve the blowing efficiency and operating current range of a protection device.

SUMMARY OF THE INVENTION

The present invention provides a protection device for over-voltage, over-current, and/or over-temperature protection. The major components of the protection device include a meltable conductor, an electrode set electrically connected to the meltable conductor, and a heating element disposed below the meltable conductor. The meltable conductor includes a low melting point bottom covering layer that covers the bottom of its core metal layer, thereby accelerating the blowing action of the protection device. Besides the acceleration of the blowing action, the present invention adjusts the thickness of at least three layers within the core metal layer and further enables the protection device to exhibit various operating currents. In this way, with the structural design of the protection device unchanged, not only is the blowing action improved, but the protection range in current is also expanded.

In accordance with an aspect of the present invention, a protection device includes a meltable conductor, an electrode set, and a heating element. The meltable conductor has a core metal layer and a bottom covering layer with low melting point. The core metal layer has a first low melting point metal layer, a second low melting point layer, and a high melting point metal layer laminated between the first low melting point metal layer and the second low melting point layer. A melting point of the high melting point metal layer is higher than a melting point of the first low melting point metal layer and a melting point of the second low melting point layer, and a thickness of the second low melting point layer is different from a thickness of the first low melting point metal layer. The bottom covering layer is disposed on a bottom surface of the core metal layer. The electrode set has a first electrode and a second electrode respectively connected to two terminals of the meltable conductor. The heating element is disposed below the bottom covering layer, by which the meltable conductor is heated up and blown by the heating element during an over-voltage event.

In an embodiment, a thickness of the bottom covering layer ranges from 0.01 mm to 1 mm.

In an embodiment, a ratio of the thickness of the first low melting point metal layer to a thickness of the high melting point metal layer to the thickness of the second low melting point layer is x:y:z. x ranges from 1 to 3. y ranges from 1 to 6. z ranges from 2 to 25. In addition, the ratio of x:y:z does not include 1:1:25.

In an embodiment, the thickness of the second low melting point layer is greater than the thickness of the first low melting point metal layer, and is greater than the thickness of the high melting point metal layer.

In an embodiment, the electrode set further includes an auxiliary electrode disposed below the bottom covering layer and between the first electrode and the second electrode.

In an embodiment, the present invention further includes an insulating layer disposed between the heating element and the auxiliary electrode. The electrode set is disposed on a substrate, and the insulating layer covers the heating element and attaches to the substrate.

In an embodiment, the bottom covering layer has a thin region located between the first electrode and the auxiliary electrode, and between the second electrode and the auxiliary electrode. The thin region becomes thinner in a direction away from the first electrode and the auxiliary electrode, and in a direction away from the second electrode and the auxiliary electrode.

In an embodiment, if a top-view area of the core metal layer is calculated as 100%, a top-view area of the bottom covering layer ranges from 30% to 90%.

In an embodiment, if the top-view area of the core metal layer is calculated as 100%, the top-view area of the bottom covering layer ranges from 60% to 90%.

In an embodiment, the bottom covering layer includes tin-silver alloy, tin-silver-copper alloy, tin-antimony alloy, tin-lead-silver alloy, tin-bismuth-silver alloy, or tin-lead-bismuth alloy, or combinations thereof.

In an embodiment, the bottom covering layer does not include gold.

In accordance with an aspect of the present invention, a protection device includes a meltable conductor, an electrode set, and a heating element. The meltable conductor has a core metal layer and a bottom covering layer with low melting point. The core metal layer consists of a low melting point metal layer and a high melting point metal layer. The low melting point metal layer covers a top surface and a bottom surface of the high melting point metal layer, and a melting point of the low melting point metal layer is lower than a melting point of the high melting point metal layer. The bottom covering layer is disposed on a bottom surface of the core metal layer. The electrode set has a first electrode and a second electrode respectively connected to two terminals of the meltable conductor. The heating element is disposed below the bottom covering layer, by which the meltable conductor is heated up and blown by the heating element in during an over-voltage event.

In an embodiment, a thickness of the bottom covering layer ranges from 0.01 mm to 1 mm.

In an embodiment, a ratio of a thickness of the low melting point metal layer to a thickness of the high melting point metal layer is x:y. x ranges from 1 to 3. y ranges from 1 to 10. The ratio of x:y does not include 1:10.

In an embodiment, the bottom covering layer includes tin-silver alloy, tin-silver-copper alloy, tin-antimony alloy, tin-lead-silver alloy, tin-bismuth-silver alloy, or tin-lead-bismuth alloy, or combinations thereof.

In an embodiment, the bottom covering layer does not include gold.

In an embodiment, the present invention further includes a substrate and an insulating layer, and the electrode set further includes an auxiliary electrode. The electrode set is disposed on the substrate. The auxiliary electrode is disposed below the bottom covering layer, and between the first electrode and the second electrode. The insulating layer is disposed between the heating element and the auxiliary electrode, wherein the insulating layer covers the heating element and attaches to the substrate.

In accordance with an aspect of the present invention, a protection device includes a meltable conductor, an electrode set, and a heating element. The meltable conductor has a core metal layer and a bottom covering layer with low melting point. The core metal layer consists of a low melting point metal layer and a high melting point metal layer. The high melting point metal layer covers a top surface and a bottom surface of the low melting point metal layer, and a melting point of the low melting point metal layer is lower than a melting point of the high melting point metal layer. The bottom covering layer is disposed on a bottom surface of the core metal layer. The electrode set has a first electrode and a second electrode respectively connected to two terminals of the meltable conductor. The heating element is disposed below the bottom covering layer, by which the meltable conductor is heated up and blown by the heating element during an over-voltage event.

In an embodiment, a thickness of the bottom covering layer ranges from 0.01 mm to 1 mm.

In an embodiment, a ratio of a thickness of the low melting point metal layer to a thickness of the high melting point metal layer is x:y. x ranges from 1 to 25. y ranges from 1 to 3. The ratio of x:y does not include 25:1.

In an embodiment, the bottom covering layer includes tin-silver alloy, tin-silver-copper alloy, tin-antimony alloy, tin-lead-silver alloy, tin-bismuth-silver alloy, or tin-lead-bismuth alloy, or combinations thereof.

In an embodiment, the bottom covering layer does not include gold.

In an embodiment, the present invention further includes a substrate and an insulating layer, and the electrode set further includes an auxiliary electrode. The electrode set is disposed on the substrate. The auxiliary electrode is disposed below the bottom covering layer, and between the first electrode and the second electrode. The insulating layer is disposed between the heating element and the auxiliary electrode, wherein the insulating layer covers the heating element and attaches to the substrate.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 1:
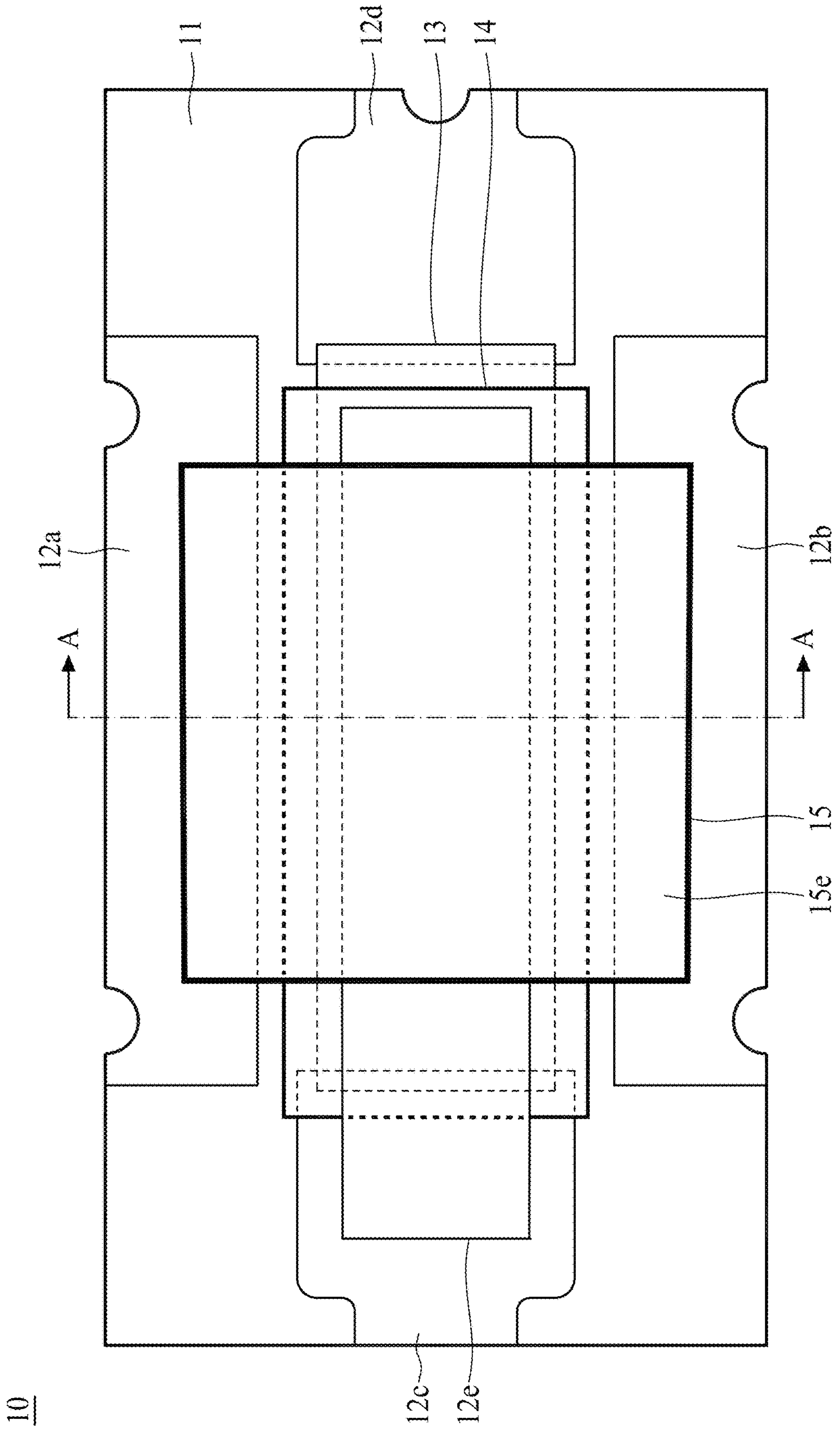
FIG. 1 shows a top view of a protection device in accordance with a first aspect of the present invention.

Please refer to FIG. 1. FIG. 1 shows a top view of a protection device 10 in accordance with a first aspect of the present invention. The major components of the protection device 10 include a meltable conductor 15, an electrode set, and a heating element 13. The meltable conductor 15 consists of multiple metal layers and at least one low-melting-point material layer, and can be quickly blown in the events of over-voltage, over-current, and/or over-temperature, thereby protecting the electronic apparatuses therefrom. The electrode set includes a first electrode 12*a*, a second electrode 12*b*, a third electrode 12*c*, a fourth electrode 12*d*, and an auxiliary electrode 12*e*. The first electrode 12*a*, the second electrode 12*b*, the third electrode 12*c*, and the fourth electrode 12*d* are printed on a substrate 11, and the auxiliary electrode 12*e* perpendicularly protrudes from the third electrode 12*c* and extends parallel to the substrate 11 and toward the right side in top view. The first electrode 12*a* is electrically connected to an input terminal, and the second electrode 12*b* is electrically connected to an output terminal of a power supply. The meltable conductor 15 is not attached to the substrate 11 and bridges the first electrode 12*a* and the second electrode 12*b*, thus being connected in series with the electronic apparatus to be protected (such as a battery). When the current or temperature becomes excessively large or high, the meltable conductor 15 is heated up and consequently blown, preventing the battery from exploding during the charge or discharge process. To further enhance the blowing efficiency of the meltable conductor 15, the heating element 13 is disposed below and actively blows the meltable conductor 15. More specifically, the heating element 13 is disposed on the substrate 11, and is connected to the third electrode 12*c* and the fourth electrode 12*d*. The meltable conductor 15 and the heating element 13 are connected to a switch and a detecting unit. If the detecting unit detects an over-voltage event, the detecting unit enables the switch to "on" and makes the heating element 13 to be electrically conductive to allow current flowing through the heating element 13. The current flows through the heating element 13, therefore the heating element 13 generates heat to melt and blow the meltable conductor 15. In addition, the auxiliary electrode 12*e* physically contacts the meltable conductor 15, facilitating the transfer of heat generated by the heating element 13 and adsorbing the molten part of the meltable conductor 15. An insulating layer 14 is further included between the auxiliary electrode 12*e* and the heating element 13. The insulating layer 14 covers the heating element 13, and extends beyond the heating element 13 in directions toward both the first electrode 12*a* and the second electrode 12*b* to attach to the substrate 11. In FIG. 1, it is understood that the solid line is used to illustrate the exposed portion as viewed from the top, while the dashed line is used to illustrate the covered portion as viewed from the top. Accordingly, for the central portion in this top view, the protection device 10 includes the meltable conductor 15, the auxiliary electrode 12*e*, the insulating layer 14, and the heating element 13, stacked from top to bottom.

Figure 2A:
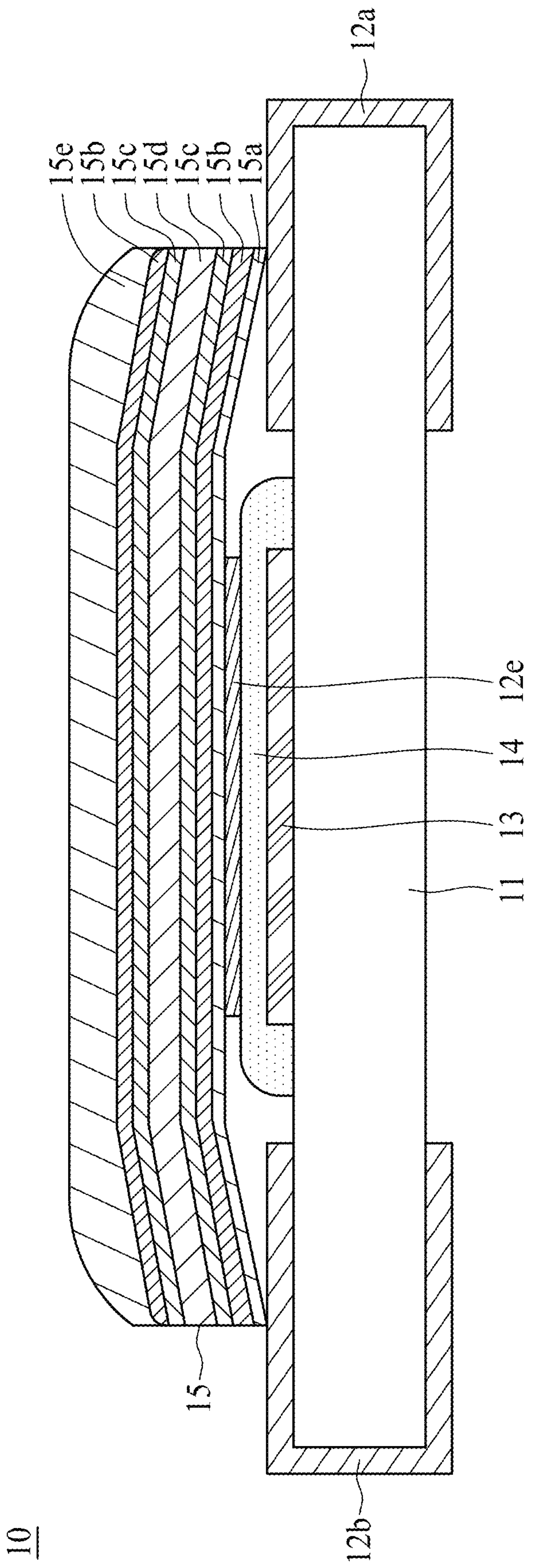
FIG. 2*a* shows a cross-sectional view of the protection device along the line AA shown in FIG. 1.

FIG. 2*a* shows a cross-sectional view of the protection device 10 along the line AA shown in FIG. 1. The protection device 10 includes the meltable conductor 15, the electrode set, and the heating element 13. The meltable conductor 15 includes a core metal layer as its major part, and a top surface and a bottom surface of the core metal layer are covered with a top covering layer 15*e* with low melting point and a bottom covering layer 15*a* with low melting point, respectively. The top covering layer 15*e* includes a rosin resin, a surfactant, a thickening agent, and/or a solvent. The core metal layer has a first low melting point metal layer 15*b*, a second low melting point layer 15*d*, and a high melting point metal layer 15*c* laminated between the first low melting point metal layer 15*b* and the second low melting point layer 15*d*. More specifically, the core metal layer has five metal layers, that is, the first low melting point metal layer 15*b*, the high melting point metal layer 15*c*, the second low melting point layer 15*d*, the high melting point metal layer 15*c*, and the first low melting point metal layer 15*b*, stacked from bottom to top. In other words, the core metal layer can be roughly divided into an outer layer, a middle layer, and an inner layer. The outer layer consists of two first low melting point metal layers 15*b*, the middle layer consists of two high melting point metal layers 15*c*, and the inner layer is a single layer of the second low melting point layer 15*d*. The high melting point metal layers 15*c* are disposed on a top surface and a bottom surface of the second low melting point layer 15*d*, respectively. The first low melting point metal layers 15*b* are disposed on a top surface of the upper one of the high melting point metal layers 15*c* and a bottom surface of the lower one of the high melting point metal layers 15*c*, respectively. In other words, the inner layer is laminated between the two metal layers of the middle layer, and the inner layer and the middle layer are laminated between the two metal layers of the outer layer. A melting point of the high melting point metal layer 15*c* is higher than a melting point of the first low melting point metal layer 15*b* and a melting point of the second low melting point layer 15*d*. The melting point of the first low melting point metal layer 15*b* may be equal to or slightly different from the melting point of the second low melting point layer 15*d*, and the main difference between them lies in the thickness. The high melting point metal layer 15*c* is made of a material selected from the group consisting of tin-silver-lead (Sn—Ag—Pb) alloy, silver (Ag), copper (Cu), gold (Au), nickel (Ni), and any combinations thereof. The first low melting point metal layer 15*b* and the second low melting point layer 15*d* are made of a material selected from the group consisting of tin (Sn), tin-silver (Sn—Ag) alloy, tin-bismuth (Sn—Bi) alloy, tin-lead (Sn—Pb) alloy, tin-cadmium (Sn—Cd) alloy, and any combinations thereof. In another embodiment, the melting point and thickness of the first low melting point metal layer 15*b* are different from those of the second low melting point layer 15*d*.

It is noted that the bottom covering layer 15*a* is additionally disposed below the core metal layer of the present invention. More specifically, the bottom covering layer 15*a* covers the first low melting point metal layer 15*b* of the core metal layer. The bottom covering layer 15*a* includes tin-silver (Sn—Ag) alloy, tin-silver-copper (Sn—Ag—Cu) alloy, tin-antimony (Sn—Sb) alloy, tin-lead-silver (Sn—Pb—Ag) alloy, tin-bismuth-silver (Sn—Bi—Ag) alloy, or tin-lead-bismuth (Sn—Pb—Bi) alloy, or any combinations thereof, but excludes gold (Au). A melting point of the bottom covering layer 15*a* is lower than that of the first low melting point metal layer 15*b*, and a eutectic alloy can be formed between them under high temperature. The eutectic alloy has a melting point lower than that of the first low melting point metal layer 15*b*, thereby accelerating the blowing action of the meltable conductor 15. However, the present invention observes that not all arbitrary sizes or structural designs of the bottom covering layer 15*a* exhibit excellent performance. With the presence of at least five metal layers (i.e., the core metal layer) in the meltable conductor 15, any slight change in the thickness, covering area, or structural design of the bottom covering layer 15*a* could significantly affect the performance of the protection device 10. In the present invention, the thickness of the core metal layer of the meltable conductor 15 ranges from 0.01 mm to 0.3 mm, and the thickness of the bottom covering layer 15*a* should be controlled within the range of 0.01 mm to 1 mm, preferably 0.1 mm to 0.3 mm. In an embodiment, the thickness of the bottom covering layer 15*a* is 0.01 mm, 0.05 mm, 0.1 mm, 0.15 mm, 0.2 mm, 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, or 1 mm. This variation allows the addition of the bottom covering layer 15*a* to accelerate the blowing action of the meltable conductor 15. At an applied power of 6 watts (W), the blowout time of the protection device 10 can be reduced to 3 seconds from 7 seconds. At an applied power of 35 W, the blowout time of the protection device 10 can be reduced to 0.09 seconds from 0.1 seconds. Moreover, within the previously mentioned thickness range of the bottom covering layer 15*a*, the present invention further adjusts the thickness of each layer in the core metal layer, thereby modifying the operating current (i.e., blowout current) of the meltable conductor 15. More specifically, a ratio of the thickness of the first low melting point metal layer 15*b* to the thickness of the high melting point metal layer 15*c* to the thickness of the second low melting point layer 15*d* is x:y:z. x ranges from 1 to 3. y ranges from 1 to 6. z ranges from 2 to 25. For example, the thickness of the first low melting point metal layer 15*b* may be 6 micrometers (μm), the thickness of the high melting point metal layer 15*c* may be 18 μm, and the thickness of the second low melting point layer 15*d* may be 150 μm, resulting in a thickness ratio of 1:3:25. In another embodiment, the thickness of the first low melting point metal layer 15*b* is greater than that of the second low melting point layer 15*d*. The thickness of the first low melting point metal layer 15*b* may be 18 μm, the thickness of the high melting point metal layer 15*c* may be 6 μm, and the thickness of the second low melting point layer 15*d* may be 12 μm, resulting in a thickness ratio of 3:1:2. Nevertheless, the operating current of the meltable conductor 15 can be expanded, ranging from 78 amperes (A) to 100 A, as long as x, y, and, z are controlled according to the aforementioned ratio. It is noted that the ratio of x:y:z does not include 1:1:25. If the second low melting point layer 15*d* is too thick, the meltable conductor 15 cannot be assembled on the substrate 11. The assembly of the meltable conductor 15 on the substrate 11 is achieved through a welding process (e.g., reflow welding). With excessive thickness, the second low melting point layer 15*d* would melt excessively under the high temperature of the welding process, leading to a severe eutectic effect that causes the blowout of the meltable conductor 15.

Regarding the electrode set, the first electrode 12*a* and the second electrode 12*b* are respectively connected to two terminals of the meltable conductor 15 in the cross-sectional view. The auxiliary electrode 12*e* is disposed below the center of the meltable conductor 15, and is located between the first electrode 12*a* and the second electrode 12*b*. More specifically, the bottom surface of the core metal layer is covered with the bottom covering layer 15*a*, and the bottom covering layer 15*a* physically contacts the first electrode 12*a*, the second electrode 12*b*, and the auxiliary electrode 12*e*. The first electrode 12*a* is electrically connected to the input terminal, and the second electrode 12*b* is electrically connected to the output terminal of the power supply. When the current or temperature becomes excessively large or high, the meltable conductor 15 is heated up and blown. In addition, the heating element 13 is disposed below the bottom covering layer 15*a*, thereby actively heating up and blowing the meltable conductor 15 in the over-voltage event. The auxiliary electrode 12*e* is positioned directly above the heating element 13, facilitating the transfer of heat generated by the heating element 13. In addition, a portion of the meltable conductor 15 forms molten metal as it is blown, and the auxiliary electrode 12*e* can serve as a platform for the adsorption and collection of the molten metal, preventing incomplete blowout. It is noted that the insulating layer 14 is disposed between the heating element 13 and the auxiliary electrode 12*e*. In the cross-sectional view, the insulating layer 14 entirely covers the heating element 13 and extends further to attach to the substrate 11, and is substantially disposed below the center of the bottom covering layer 15*a*. The bottom covering layer 15*a* is not in physical contact with the insulating layer 14, and hence there is a gap between the bottom covering layer 15*a* and the insulating layer 14. The insulating layer 14 exhibits better thermal conductivity than ambient air. Consequently, the heat generated by the heating element 13 can be more concentrated and directly transferred upwards to the bottom covering layer 15*a*, accelerating the blowing action.

Figure 2B:
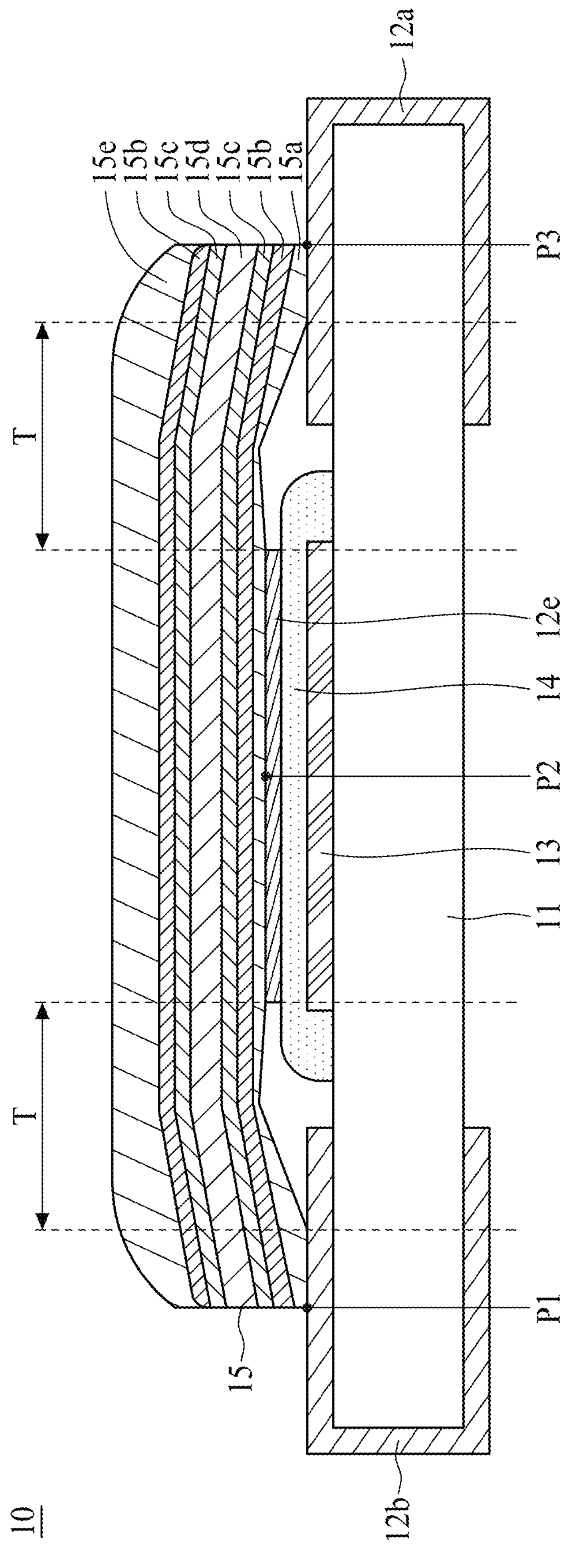
FIG. 2*b* shows an embodiment of the protection device shown in FIG. 2*a;*

Please refer to FIG. 2*b*, which shows another embodiment of the protection device shown in FIG. 2*a*. The difference between FIG. 2*b* and FIG. 2*a* lies in the structure of the bottom covering layer 15*a*. The thickness of the bottom covering layer 15*a* is not uniform; that is, the bottom covering layer 15*a* exhibits a thinner thickness in certain regions (thin region T). In the cross-sectional view, three points of location are illustrated on the bottom covering layer 15*a*. The left one is a first terminal point P1; the middle one is a middle point P2; and the right one is a second terminal point P3. The bottom covering layer 15*a* has the thin region T located between the first terminal point P1 and the middle point P2, and also has the thin region T located between the second terminal point P3 and the middle point P2. In the thin region T of the bottom covering layer 15*a*, the thickness of the bottom covering layer 15*a* tapers from the electrodes 12*a*, 12*b* and 12*e*. More specifically, the bottom covering layer 15*a* has the thin region T located between the first electrode 12*a* and the auxiliary electrode 12*e*, and becomes thinner in a direction away from the first electrode 12*a* and the auxiliary electrode 12*e*; and the bottom covering layer 15*a* also has the thin region T located between the second electrode 12*b* and the auxiliary electrode 12*e*, and becomes thinner in a direction away from the second electrode 12*b* and the auxiliary electrode 12*e*. According to this design, the distribution of the bottom covering layer 15*a* can be concentrated on the electrodes 12*a*, 12*b*, and 12*e*, thereby accelerating the blowing action and efficiently disposing the bottom covering layer 15*a*, saving unnecessary usage thereof. With the design of the thin region T, a covering area of the bottom covering layer 15*a* can also be adjusted. For example, in the thin region T, a part of the bottom covering layer 15*a* may be recessed to expose the first low melting point metal layer 15*b*. That is, in the thin region T of the bottom covering layer 15*a*, the thickness of the bottom covering layer 15*a* tapers from the electrodes 12*a*, 12*b* and 12*e*, and a part of the first low melting point metal layer 15*b* is exposed and not covered with the bottom covering layer 15*a*. In an embodiment, there is no bottom covering layer 15*a* included in the thin region T depending on the requirements; that is, the first low melting point metal layer 15*b* is entirely not covered with the bottom covering layer 15*a* in the thin region T. From the above, the present invention adjusts the covering area of the bottom covering layer 15*a*, thereby further accelerating the blowing action of the meltable conductor 15. In the top view (i.e., the perspective of FIG. 1), the top-view areas of the layers of the core layer are substantially the same as each other. In an embodiment, if a top-view area of the core metal layer is calculated as 100%, a top-view area of the bottom covering layer 15*a* can be adjusted within the range of 30% to 90%, which means that the bottom covering layer 15*a* has a covering ratio ranging from 30% to 90%, such as 30%, 35%, 40%, 45%, 50%, 55%, 60%, 65%, 70%, 75%, 80%, 85%, or 90%. Under the covering ratio above, the meltable conductor 15 may be blown in two minutes without the help of the heating element 13. In another embodiment, if a top-view area of the core metal layer is calculated as 100%, a top-view area of the bottom covering layer 15*a* ranges from 60% to 90% in order to increase the operating current.

The design of the thin region T can be varied. Please refer to FIG. 2*c*, which shows another embodiment shown in FIG. 2*b*. The difference between FIG. 2*c* and FIG. 2*b* lies in the location of the thin region T. In this embodiment, the thin region T of the bottom covering layer 15*a* is located directly above the auxiliary electrode 12*e*. The thin region T is located between the first electrode 12*a* and the second electrode 12*b*, and the thickness of the bottom covering layer 15*a* becomes thinner in a direction away from the first electrode 12*a* and the second electrode 12*b*. In another embodiment, thin region T can be located much closer or adjacent to the first electrode 12*a* and/or the second electrode 12*b*. From the above, the location of the thin region T of the protection device 10 can be adjusted depending on the requirements.

Figure 3:
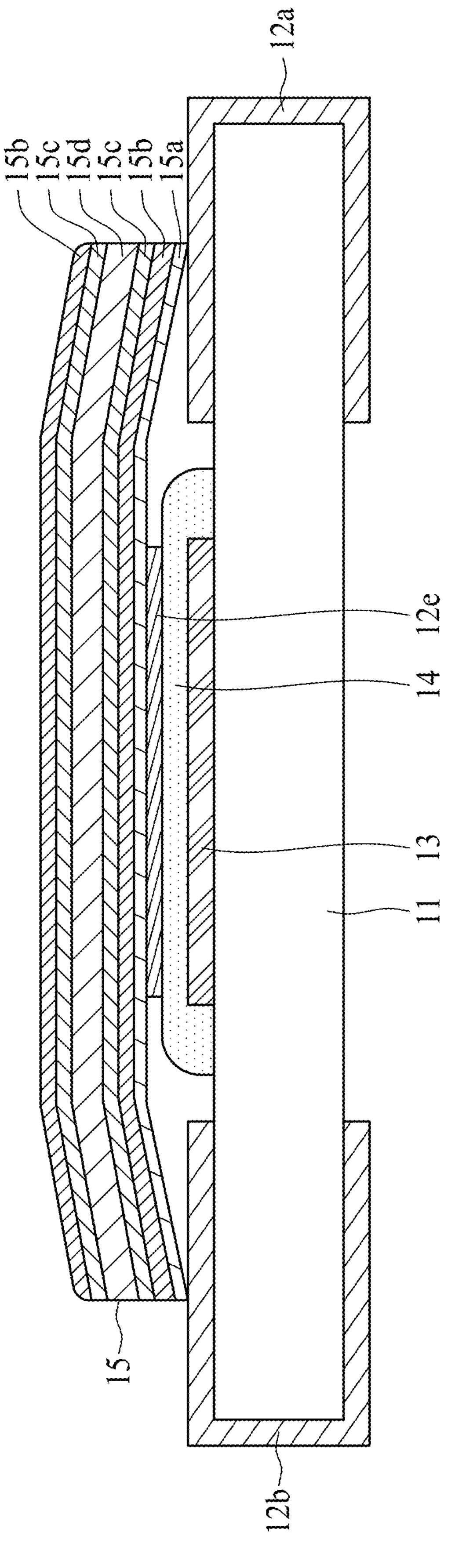
FIG. 3 shows a cross-sectional view of a protection device in accordance with a second aspect of the present invention.

Please refer to FIG. 3, which shows a cross-sectional view of a protection device 10 in accordance with a second aspect of the present invention. The difference between FIG. 3 and FIG. 2*a* lies in the top covering layer 15*e*. The protection device 10 in FIG. 3 does not include the top covering layer 15*e*. The thickness ratio of the core metal layer, the covering ratio of the bottom covering layer 15*a*, the design of the thin region T, and other material/structural designs previously mentioned can also be applied to the protection device 10 of the second aspect of the present invention.

In order to describe the present invention more clearly, the following verification is shown.

TABLE 1

| Group | Thickness of bottom covering layer (mm) | Resistance (mΩ) | Blowout time at 6 W (s) | Blowout time at 35 W (s) |
|---|---|---|---|---|
| E1 | 0.26 | 1.75 | 3 | 0.09 |
| C1 | — | 1.7 | 6.6 | 0.11 |

As shown in Table 1, the test group E1 represents embodiment E1 of the present invention, and the test group C1 represents comparative example C1. The embodiment E1 adopts the protection device 10 in FIG. 2*a*, and the comparative example C1 adopts the protection device 10 with the lack of the bottom covering layer 15*a*. In addition, the bottom covering layer 15*a* is made of Sn—Ag—Cu alloy. In the embodiment E1, the bottom covering layer 15*a* has a thickness of 0.26 mm, and the electrical resistance of the meltable conductor 15 is 1.75 mΩ. In the comparative example C1, there is no bottom covering layer 15*a*, and the electrical resistance of the meltable conductor remains generally the same at 1.7 mΩ. In this test, the protection device is electrically connected to a power supply that controls the applied power, thereby observing the blowout time of the meltable conductor in the protection device at different powers. At applied power of 6 W, the heating element 13 of the protection device 10 in the embodiment E1 turns on and quickly blows the meltable conductor 15 in 3 seconds, while the comparative example C1 takes at least double time (i.e., 6.6 seconds) to blow the meltable conductor. At applied power of 35 W, the heating element 13 of the protection device 10 in the embodiment E1 turns on and quickly blows the meltable conductor 15 in 0.09 seconds, and similarly, its blowout time is less than that of the comparative example C1. From the above, the blowing efficiency of the meltable conductor 15 can be greatly improved when the bottom covering layer 15*a* covers the bottom of the first low melting point metal layer 15*b*.

In light of the preliminary effectiveness of the above improvement, subsequent tests (data shown in Tables 2 to 4) further isolate the meltable conductor 15 from the protection device 10 of the present invention. Over-current is directly applied to this meltable conductor 15 and its melting characteristics are investigated.

TABLE 2

| Group | Thickness (μm) first low melting point metal layer:high melting point metal layer:second low melting point layer | Reflow | Blowout current (A) |
|---|---|---|---|
| E2 | 6:18:150 | Pass | 88 |
| | 6:24:150 | Pass | 94 |
| | 6:36:150 | Pass | 100 |
| | 12:6:54 | Pass | 82 |
| | 18:6:12 | Pass | 78 |
| C2 | 6:6:150 | Fail | — |

In Table 2, the test groups E2 and C2 represent embodiment E2 of the present invention and comparative example C2, respectively. Both the embodiment E2 and comparative example C2 adopt the protection device 10 in FIG. 2*a*, and the difference between them lies in the thickness ratio of multiple layers within the core metal layer. More specifically, the meltable conductor 15 has the bottom covering layer 15*a* with a thickness of 0.26 mm, and its protection range in operating current is further expanded by adjusting the thickness of each layer within the core metal layer. The core metal layer consists of the first low melting point metal layers 15*b*, the second low melting point layer 15*d*, and the high melting point metal layers 15*c*. Each first low melting point metal layer 15*b* and the second low melting point layer 15*d* are made of tin, and the difference between them is the thickness. Each high melting point metal layer 15*c* is made of silver. The melting points of the first low melting point metal layer 15*b* and the second low melting point layer 15*d* are both lower than that of the high melting point metal layer 15*c*, thereby accelerating the melting of the high melting point metal layer 15*c*. Moreover, in the embodiment E2, the required blowout current varies as the thickness ratio of these three metal layers is adjusted based on the five different thickness ratios. More specifically, in the embodiment E2, the thickness of the first low melting point metal layer 15*b* is set within the range of 6 μm to 18 μm; the thickness of the high melting point metal layer 15*c* is set within the range of 6 μm to 36 μm; and the thickness of the second low melting point layer 15*d* is set within the range of 12 μm to 150 μm. The core metal layer can be formed layer by layer based on the aforementioned thickness ranges, and can be properly assembled on the substrate 11 through reflow welding. In one situation, the present invention adjusts the high melting point metal layer 15*c* to be in a thicker range (i.e., with the thickness ranging from 18 μm to 36 μm), while maintaining the low melting point metal layers at the fixed thicknesses (i.e., the first low melting point metal layer 15*b* with the thickness of 6 μm and the second low melting point layer 15*d* with the thickness of 150 μm); in this way, the low melting point metal layers accelerate the melting of the high melting point metal layer 15*c* below its melting point, while the blowout current of the meltable conductor 15 increases to the range of 88 A to 100 A. In another situation, the present invention adjusts the high melting point metal layer 15*c* to be thinner (i.e., with the thickness of 6 μm) while maintaining the low melting point metal layers at the specific thicknesses; in this way, the blowout current of the meltable conductor 15 decreases to the range of 78 A to 82 A. It is noted that the relative thickness of the low melting point metal layer should not be too large. As shown in the comparative example C2, the meltable conductor 15 cannot be assembled on the substrate 11 if the thickness of the second low melting point layer 15*d* is much greater than that of the high melting point metal layer 15*c* and the first low melting point metal layer 15*b*. The reason for this is described above; that is, the second low melting point layer 15*d* melts and erodes the high melting point metal layer 15*c* excessively under the high temperature of reflow welding, leading to the blowout of the meltable conductor 15 during assembly.

In addition, the thicknesses of the first low melting point metal layer 15*b*, the high melting point metal layer 15*c*, and the second low melting point layer 15*d* can be expressed in ratio based on the results of Table 2. The thickness of the first low melting point metal layer 15*b* is defined as x; the thickness of the high melting point metal layer 15*c* is defined as y; and the thickness of the second low melting point layer 15*d* is defined as z. According to the embodiment E2, x:y:z may be 1:3:25, 1:4:25, 1:6:25, 2:1:9 or 3:1:2. The aforementioned thickness ratios can be applied to the protection devices with different sizes while achieving the same or similar technical effect. In one embodiment, the thickness of the first low melting point metal layer 15*b* ranges from 5 μm to 21 μm; the thickness of the high melting point metal layer 15*c* ranges from 5 μm to 42 μm; and the thickness of the second low melting point layer 15*d* ranges from 10 μm to 175 μm. From the above, under the circumstance that the thickness of the bottom covering layer 15*a* is 0.26 mm, the adjustment of the thickness ratio within the core metal layer allows the meltable conductor 15 to be used in various electronic apparatuses with different rated currents. Considering the measurement error and the permissible error tolerance, the thickness of the bottom covering layer 15*a* may vary within the range of 0.01 mm to 1 mm while still achieving the same or similar technical effect.

Besides the expanded range of the blowout current, the present invention also adjusts the covering area of the bottom covering layer 15*a*. This adjustment ensures that the blowout time of the meltable conductor 15 complies with UL (Underwriters Laboratories) standard, which requires blowout in two minutes. Details are provided in Table 3.

TABLE 3

| Group | Top-view area of bottom covering layer ($mm^2$) | Top-view area of core metal layer ($mm^2$) | Covering ratio (%) | Blowout current (A) |
|---|---|---|---|---|
| E3 | 9.6 | 12.25 | 78.4% | 87 |
| E4 | 8.96 | 12.25 | 73.1% | 84 |
| E5 | 7.68 | 12.25 | 62.7% | 78 |
| E6 | 6.4 | 12.25 | 52.2% | 68 |
| E7 | 4.8 | 12.25 | 39.2% | 65 |
| C3 | 12.25 | 12.25 | 100% | — |
| C4 | 10.56 | 12.25 | 90.2% | — |
| C5 | 3.64 | 12.25 | 29.7% | — |

In Table 3, the test groups E3 to E7 and test groups C3 to C5 represent embodiments E3 to E7 of the present invention and comparative examples C3 to C5, respectively. The embodiments E3 to E7 and comparative examples C3 to C5 adopt the protection device 10 in FIG. 2*b*, and the difference between them lies in the covering area of the bottom covering layer 15*a*. As described above, the bottom covering layer 15*a* in the thin region T can be recessed, allowing the bottom covering layer 15*a* to expose part of the first low melting point metal layer 15*b*. That is, the bottom covering layer 15*a* may not entirely cover the bottom of the core metal layer. More specifically, the thickness of the bottom covering layer 15*a* is 0.26 mm outside the thin region T, and the thickness of the core metal layer is 0.17 mm (with the thickness ratio of x:y:z=1:3:25). In the thin region T, the thickness of the bottom covering layer 15*a* is less than 0.26 mm, tapering from the electrodes 12*a*, 12*b*, and 12*e* to expose the first low melting point metal layer 15*b*. Additionally, the length and width of the core metal layer are both 3.5 mm, and thus its top-view area is 12.25 $mm^2$. By using the top-view area of the core metal layer as a reference, the present invention can adjust the covering area of the bottom covering layer 15*a* through the thin region T. The covering ratio is defined as a ratio by dividing a top-view area of the bottom covering layer 15*a* by a top-view area of the core metal layer, and is expressed in percentage.

In the embodiments E3 to E7, the covering ratio of the bottom covering layer 15*a* ranges from 39.2% to 78.4%. In these cases, the meltable conductor 15 is blown in two minutes, with the blowout current ranging from 65 A to 87 A. Concentrating the bottom covering layer 15*a* on the electrodes 12*a*, 12*b*, and 12*e* accelerates the blowing action and efficiently manages the distribution of the bottom covering layer 15*a*, saving unnecessary usage. However, it is noted that there are adverse effects if the covering ratio is too high or too low. If the covering ratio exceeds 90.2% (i.e., the comparative examples C3 and C4), an excessive amount of the bottom covering layer 15*a* is melted during heating. The excessive amount of the molten portion of bottom covering layer 15*a* would be adsorbed on the entire top surfaces of the first electrode 12*a*, the second electrode 12*b*, and the auxiliary electrode 12*e*. This increases the risk of reconnection of the molten bottom covering materials on the electrodes 12*a*, 12*b*, and 12*e*, leading to the incomplete blowout of the meltable conductor 15. If the covering ratio is lower than 29.7% (i.e., the comparative example C5), there is an insufficient amount of eutectic alloy formed from the bottom covering layer 15*a* and the first low melting point metal layer 15*b*. The meltable conductor 15 cannot be blown in two minutes. It is added that the covering ratio of the bottom covering layer 15*a* described above can be applied to the meltable conductors 15 with different sizes. For example, the length and width (length×width) of the core metal layer of the meltable conductor 15 may be 2.3 mm×2.3 mm, 1.85 mm×1.85 mm, or other sizes commonly used in the industry. Considering the measurement error and the permissible error tolerance, the covering ratio of the embodiments E3 to E7 may vary within the range of 30% to 90% while achieving the same or similar technical effect.

On the basis mentioned above, the aforementioned design of the bottom covering layer 15*a* can also be applied to the core metal layers with different layer number. Please refer to FIG. 4, which shows a cross-sectional view of a protection device 10 in accordance with a third aspect of the present invention. The difference between FIG. 4 and FIG. 2*a* lies in the layer number of the core metal layer and the thickness ratio thereof. In this aspect, the protection device 10 includes a meltable conductor 25, the electrode set, and the heating element 13. The meltable conductor 25 has a core metal layer and a bottom covering layer 25*a* with low melting point. The core metal layer consists of a low melting point metal layer 25*b* and a high melting point metal layer 25*c*. The low melting point metal layer 25*b* covers a top surface and a bottom surface of the high melting point metal layer 25*c*, and a melting point of the low melting point metal layer 25*b* is lower than a melting point of the high melting point metal layer 25*c*. The bottom covering layer 25*a* is disposed on a bottom surface of the core metal layer. The electrode set has the first electrode 12*a* and the second electrode 12*b* respectively connected to two terminals of the meltable conductor 25. The heating element 13 is disposed below the bottom covering layer 25*a*, by which the meltable conductor 25 is heated up and blown out by the heating element 13 during an over-voltage event. It is noted that the core metal layer of the protection device 10 in FIG. 4 may consist of three independent layers (i.e., two layers of the low melting point metal layer 25*b* and one layer of the high melting point metal layer 25*c* laminated therebetween), or may consist of a packaging structure (i.e., the high melting point metal layer 25*c* partially or entirely wrapped by the low melting point metal layer 25*b*). The materials of the bottom covering layer 25*a* and top covering layer 25*d* with low melting point are the same as those of the bottom covering layer 15*a* and top covering layer 15*e*. Likewise, the thickness of each layer within the core metal layer needs to be carefully controlled. More specifically, the thickness ratio of the low melting point metal layer 25*b* to the high melting point metal layer 25*c* can be defined as x:y. x ranges from 1 to 3. y ranges from 1 to 10. Through the adjustment of the thickness ratio described above, the meltable conductor 25 may exhibit different operating currents. It is noted that the ratio of x:y does not include 1:10. If the thickness ratio of the high melting point metal layer 25*c* is too high, the meltable conductor 25 cannot be blown out.

Figure 4:
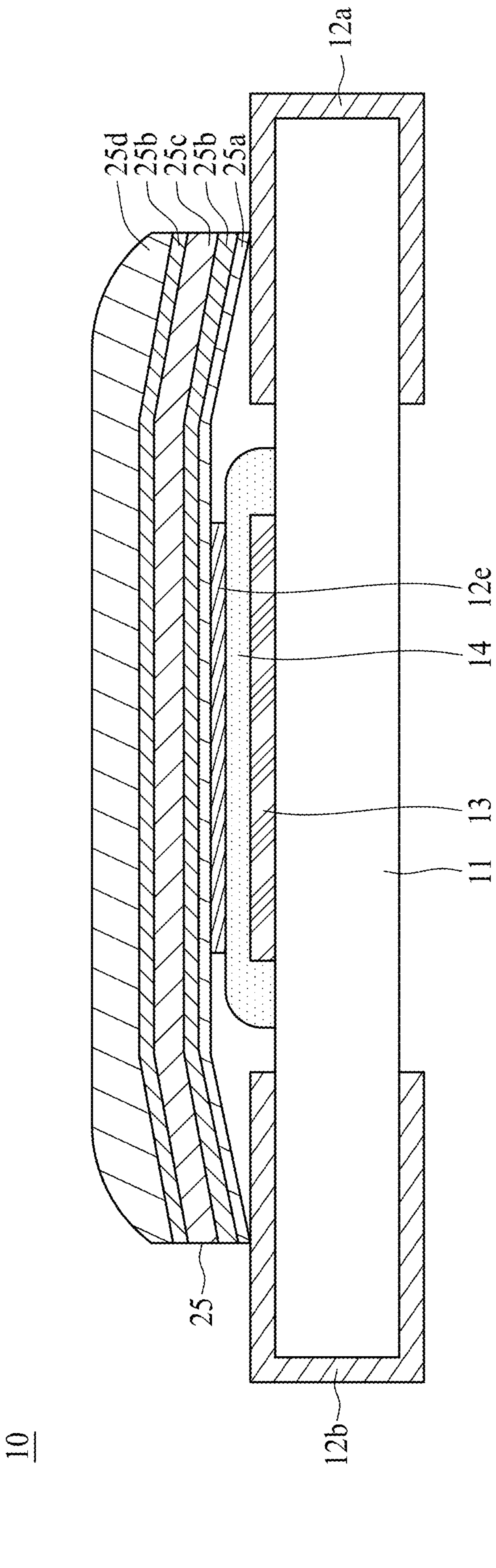
FIG. 4 shows a cross-sectional view of a protection device in accordance with a third aspect of the present invention.

It is added that the protection device 10 in FIG. 4 also includes the insulating layer 14 disposed between the heating element 13 and the auxiliary electrode 12*e*. Likewise, in the cross-sectional view, the insulating layer 14 entirely covers the heating element 13 and extends further to attach to the substrate 11, and is substantially disposed below the center of the bottom covering layer 25*a*. The bottom covering layer 25*a* is not in physical contact with the insulating layer 14, and hence there is a gap between the bottom covering layer 25*a* and the insulating layer 14. The insulating layer 14 exhibits better thermal conductivity than ambient air. Consequently, the heat generated by the heating element 13 can be more concentrated and directly transferred upwards to the bottom covering layer 25*a*, accelerating the blowing action.

Figure 2C:
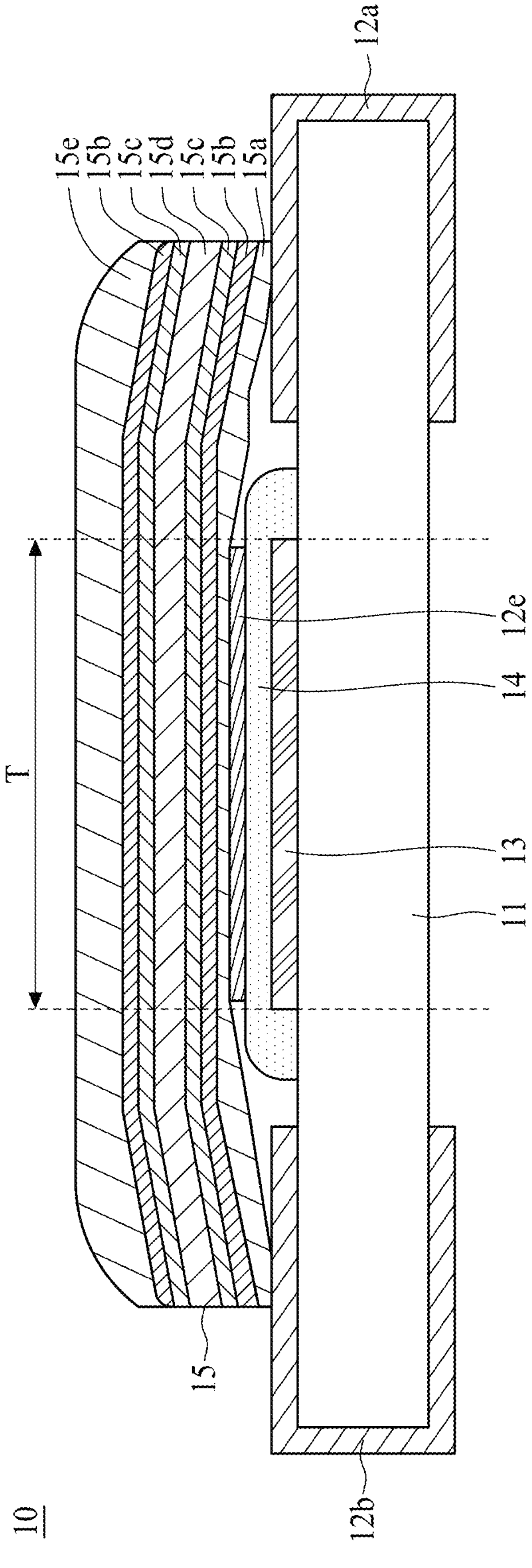
FIG. 2*c* shows an embodiment of the protection device shown in FIG. 2*a;*

In an embodiment, the protection device 10 in FIG. 4 may has the same design of the thin region (not shown) as that in FIG. 2*b* and FIG. 2*c*. That is, the thickness of the bottom covering layer 25*a* is not uniform. The bottom covering layer 25*a* has the thin region located between the first electrode 12*a* and the auxiliary electrode 12*e*, and becomes thinner in a direction away from the first electrode 12*a* and the auxiliary electrode 12*e*; and/or the bottom covering layer 25*a* also has the thin region T located between the second electrode 12*b* and the auxiliary electrode 12*e*, and becomes thinner in a direction away from the second electrode 12*b* and the auxiliary electrode 12*e*.

In another embodiment, in FIG. 4, the stacking sequence of the layers within the core metal layer is different; specifically, the position of the low melting point metal layer 25*b* can be exchanged with the position of the high melting point metal layer 25*c*. That is, the core metal layer of the protection device 10 in FIG. 4 may consist of three independent layers (i.e., two layers of the high melting point metal layer 25*c* and one layer of the low melting point metal layer 25*b* laminated therebetween), or may consist of a packaging structure (i.e., the low melting point metal layer 25*b* partially or entirely wrapped by the high melting point metal layer 25*c*). The thickness of each layer within the core metal layer also needs to be carefully controlled. More specifically, the thickness ratio of the low melting point metal layer 25*b* to the high melting point metal layer 25*c* can be defined as x:y. x ranges from 1 to 25. y ranges from 1 to 3. Through the adjustment of the thickness ratio described above, the meltable conductor 25 may exhibit different operating currents. It is noted that the ratio of x:y does not include 25:1. If the thickness ratio of the low melting point metal layer 25*b* is too high, the meltable conductor 25 cannot be assembled on the substrate 11. The assembly of the meltable conductor 25 on the substrate 11 is achieved through a welding process (e.g., reflow welding), and the low melting point metal layer 25*b* would melt excessively under the high temperature of the welding process, leading to a severe eutectic effect that causes the blowout of the meltable conductor 25.

To clearly describe the two embodiments of FIG. 4, the present invention adjusts the thickness of the layers within the core metal layer, and the verification is shown below. Likewise, the meltable conductor 25 needs to comply with the required blowout time (2 minutes) of the UL standard.

TABLE 4

| Group | Thickness (μm) low melting point metal layer:high melting point metal layer | Reflow | Blowout current (A) |
|---|---|---|---|
| E8 | 6:36 | Pass | 95 |
| | 6:18 | Pass | 87 |
| | 18:6 | Pass | 72 |
| C6 | 6:60 | Pass | Not blown |
| E9 | 120:18 | Pass | 76 |
| | 60:6 | Pass | 70 |
| | 6:12 | Pass | 67 |
| C7 | 150:6 | Fail | — |

In Table 4, the test groups E8 and E9 represent embodiments E8 and E9 of the present invention, respectively, and the test groups C6 and C7 represent comparative examples C6 and C7, respectively. More specifically, the meltable conductor 25 has the bottom covering layer 25*a* with a thickness of 0.26 mm, and its protection range in operating current is further expanded by adjusting the thickness of each layer within the core metal layer. It is noted that the protection devices 10 of the embodiment E8 and the comparative example C6 adopt the same configuration for the core metal layer (i.e., two layers of the low melting point metal layer 25*b* and one layer of the high melting point metal layer 25*c* laminated therebetween), and the only difference lies in the thickness ratio between the layers. Similarly, the protection devices 10 of the embodiment E9 and the comparative example C7 adopt the same configuration for the core metal layer (i.e., two layers of the high melting point metal layer 25*c* and one layer of the low melting point metal layer 25*b* laminated therebetween), and the only difference lies in the thickness ratio between the layers. The low melting point metal layer 25*b* is made of tin, and the high melting point metal layer 25*c* is made of silver. The melting point of the low melting point metal layer 25*b* is lower than that of the high melting point metal layer 25*c*, thereby accelerating the melting of the high melting point metal layer 25*c*.

According to the embodiment E8, the required blowout current varies as the thickness ratio of these two metal layers is adjusted based on the three different thickness ratios. More specifically, the thickness of the low melting point metal layer 25*b* is set within the range of 6 μm to 18 μm, and the thickness of the high melting point metal layer 25*c* is set within the range of 6 μm to 36 μm. By changing the ratio between them, the blowout current can be adjusted within the range of 72 A to 95 A. It is noted that the relative thickness of the high melting point metal layer 25*c* should not be too large. In the comparative example C6, as the high melting point metal layer 25*c* is too thick, it takes a longer time to blow the meltable conductor 25, exceeding the required blowout time (2 minutes) specified by the UL standard, that is, the meltable conductor 25 is not blown in 2 minutes. Additionally, the thickness of the low melting point metal layer 25*b* and the thickness of the high melting point metal layer 25*c* can be expressed in ratio based on the results of Table 4. The thickness of the low melting point metal layer 25*b* is defined as x, and the thickness of the high melting point metal layer 25*c* is defined as y. According to the embodiment E8, x:y may be 1:6, 1:3, or 3:1. The aforementioned thickness ratios can be applied to the protection devices with different sizes while achieving the same or similar technical effect. For example, the thickness of the low melting point metal layer 25*b* may range from 5 μm to 21 μm, and the thickness of the high melting point metal layer 25*c* may range from 5 μm to 70 μm.

In the embodiment E9, the thickness of the low melting point metal layer 25*b* is set within the range of 6 μm to 120 μm, and the thickness of the high melting point metal layer 25*c* is set within the range of 6 μm to 18 μm. By changing the ratio between them, the blowout current can be adjusted within the range of 67 A to 76 A. It is noted that the relative thickness of the low melting point metal layer 25*b* should not be too large. In the comparative example C7, because the low melting point metal layer 25*b* is excessively thick, a severe eutectic effect occurs and the meltable conductor 25 cannot be properly assembled on the substrate 11. The low melting point metal layer 25*b* melts and erodes the high melting point metal layer 25*c* excessively under the high temperature of reflow welding, leading to the blowout of the meltable conductor 25 during assembly. According to the embodiment E9, x:y may be 20:3, 10:1, or 1:2. The aforementioned thickness ratios can be applied to the protection devices with different sizes while achieving the same or similar technical effect. For example, the thickness of the low melting point metal layer 25*b* may range from 5 μm to 140 μm, and the thickness of the high melting point metal layer 25*c* may range from 5 μm to 21 μm.

The present invention may be applied to the protection devices with different structural designs. Please refer to FIG. 5 to FIG. 7.

Figure 5:
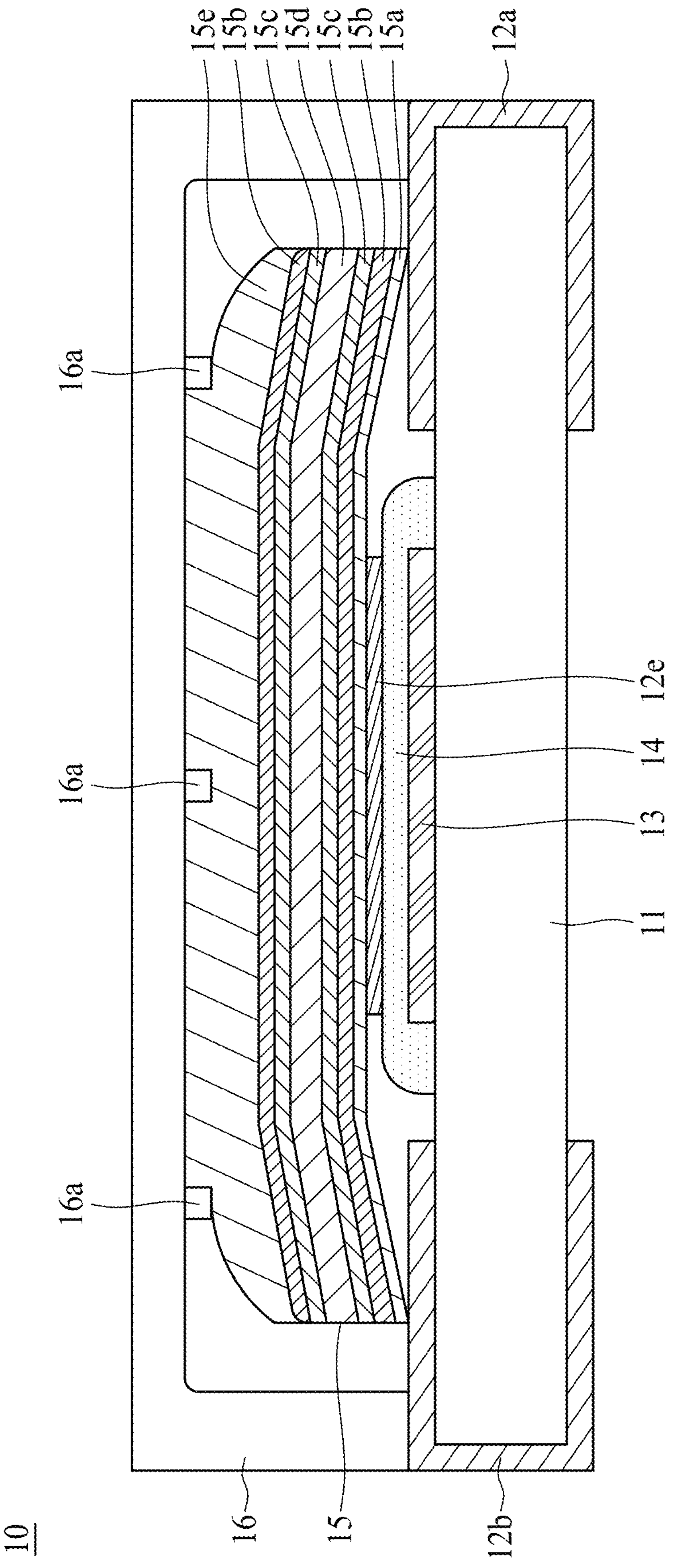
FIG. 5 shows a cross-sectional view of a protection device in accordance with a fourth aspect of the present invention.

FIG. 5 shows a cross-sectional view of a protection device 10 in accordance with a fourth aspect of the present invention. The difference between FIG. 5 and FIG. 2*a* lies in a covering body 16. The covering body 16 has a planar substrate and a peripheral wall extending from and below the planar substrate. The peripheral wall surrounds to form an accommodation space. The meltable conductor 15 is disposed in the accommodation space. In addition, the covering body 16 further includes a plurality of bulges 16*a*. The bulges 16*a* are in physical contact with the top covering layer 15*e*. Therefore, the top covering layer 15*e* can be adsorbed adjacent to the bulges 16*a*. Owing to the design of the covering body 16, the meltable conductor 15 is isolated and protected from the external environment.

Figure 6:
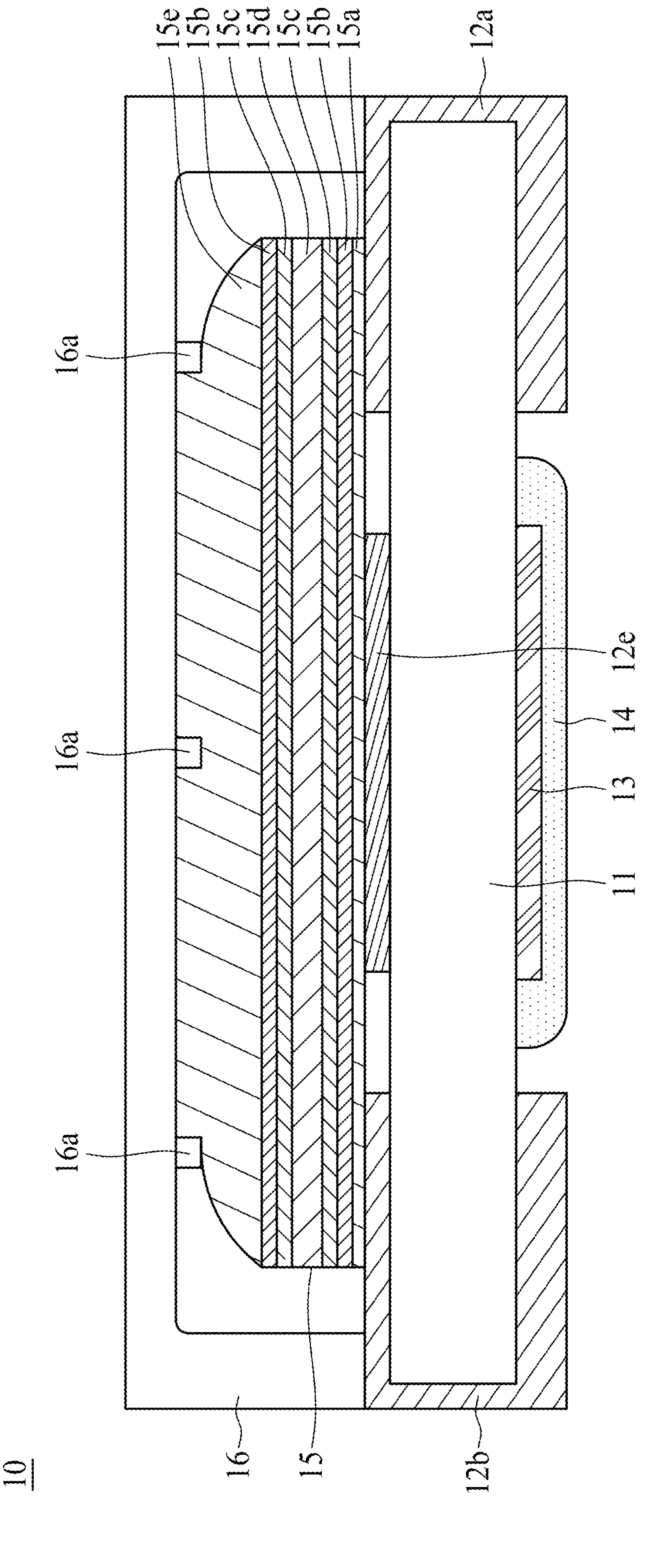
FIG. 6 shows a cross-sectional view of a protection device in accordance with a fifth aspect of the present invention.

FIG. 6 shows a cross-sectional view of a protection device 10 in accordance with a fifth aspect of the present invention. The difference between FIG. 6 and FIG. 5 lies in the positions of the heating element 13 and the insulating layer 14. The heating element 13 of the protection device 10 may be disposed below the substrate 11, and be covered with the insulating layer 14. The substrate 11 has a top surface and a bottom surface opposite to the top surface. The auxiliary electrode 12*e* is disposed on the top surface of the substrate 11, and is in physical contact with the above bottom covering layer 15*a*. The heating element 13 is basically aligned with the auxiliary electrode 12*e* and disposed on the bottom surface of the substrate 11. The insulating layer 14 covers the heating element 13 and extends further to attach to the bottom surface of the substrate 11. This configuration allows for a thinner layered-structure above the substrate 11, and the covering body 16 can also be designed to be thinner.

Figure 7:
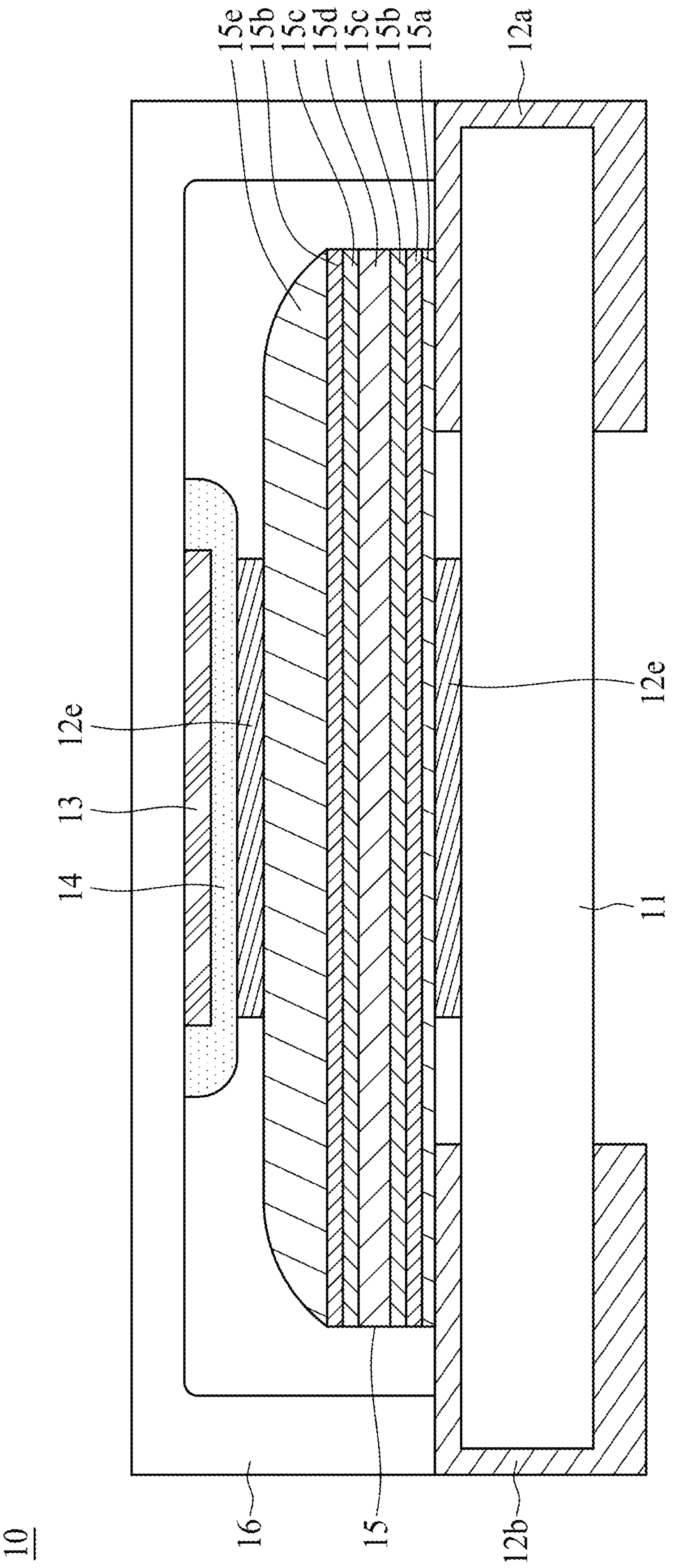
FIG. 7 shows a cross-sectional view of a protection device in accordance with a sixth aspect of the present invention.

FIG. 7 shows a cross-sectional view of a protection device 10 in accordance with a sixth aspect of the present invention. The difference between FIG. 7 and FIG. 5 lies in the positions of the heating element 13 and the insulating layer 14, and the number of the auxiliary electrode 12*e*. The heating element 13 of the protection device 10 may be disposed on the bottom surface of the planar substrate of the covering body 16, and be covered with the insulating layer 14. The auxiliary electrodes 12*e* are disposed on the insulating layer 14 and the top surface of the substrate 11, respectively. This configuration allows the auxiliary electrodes 12*e* to attach to both the top and bottom of the meltable conductor 15. Therefore, the protection device 10 with its heating element 13 installed on the top can be optionally used depending on the requirements of the industry.

The above-described embodiments of the present invention are intended to be illustrative only. Numerous alternative embodiments may be devised by persons skilled in the art without departing from the scope of the following claims.

What is claimed is:

1. A protection device, comprising:

a meltable conductor having a core metal layer and a bottom covering layer with low melting point, wherein:

the core metal layer has a first low melting point metal layer, a second low melting point metal layer, and a high melting point metal layer laminated between the first low melting point metal layer and the second low melting point metal layer, wherein a melting point of the high melting point metal layer is higher than a melting point of the first low melting point metal layer and a melting point of the second low melting point metal layer, and a thickness of the second low melting point metal layer is different from a thickness of the first low melting point metal layer, wherein a ratio of the thickness of the first low melting point metal layer to a thickness of the high melting point metal layer to the thickness of the second low melting point metal layer is x:y:z, wherein:

x ranges from 1 to 3;

y ranges from 1 to 6; and z ranges from 2 to 25, wherein the ratio of x:y:z does not comprise 1:1:25; and the bottom covering layer is disposed on a bottom surface of the core metal layer, wherein a melting point of the bottom covering layer is different from the melting points of the first low melting point metal layer and the second low melting point metal layer, and the bottom covering layer comprises tin-silver alloy, tin-silver-copper alloy, tin-antimony alloy, tin-lead-silver alloy, tin-bismuth-silver alloy, or tin-lead-bismuth alloy, or combinations thereof;

an electrode set having a first electrode and a second electrode respectively connected to two terminals of the meltable conductor; and a heating element disposed below the bottom covering layer, whereby the meltable conductor is heated up and blown by the heating element during an over-voltage event.

2. The protection device of claim 1, wherein a thickness of the bottom covering layer ranges from 0.01 mm to 1 mm.

3. The protection device of claim 1, wherein the thickness of the second low melting point metal layer is greater than the thickness of the first low melting point metal layer, and is greater than the thickness of the high melting point metal layer.

4. The protection device of claim 1, wherein the electrode set further comprises an auxiliary electrode disposed below the bottom covering layer and between the first electrode and the second electrode.

5. The protection device of claim 4, further comprising an insulating layer disposed between the heating element and the auxiliary electrode, wherein the electrode set is disposed on a substrate, and the insulating layer covers the heating element and attaches to the substrate.

6. The protection device of claim 4, wherein the bottom covering layer has a thin region located between the first electrode and the auxiliary electrode, and between the second electrode and the auxiliary electrode, wherein the thin region becomes thinner in a direction away from the first electrode and the auxiliary electrode, and in a direction away from the second electrode and the auxiliary electrode.

7. The protection device of claim 1, wherein if a top-view area of the core metal layer is calculated as 100%, a top-view area of the bottom covering layer ranges from 30% to 90%.

8. The protection device of claim 7, wherein if the top-view area of the core metal layer is calculated as 100%, the top-view area of the bottom covering layer ranges from 60% to 90%.

* * * * *